US008024495B2

(12) United States Patent  
Aoki (10) Patent No.: US 8,024,495 B2  
(45) Date of Patent: Sep. 20, 2011

(54) COMMUNICATION DATA CONTROLLER

(75) Inventor: Kazuo Aoki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 833 days.

(21) Appl. No.: 11/169,747

(22) Filed: Jun. 30, 2005

(65) Prior Publication Data

US 2006/0215678 A1    Sep. 28, 2006

(30) Foreign Application Priority Data

Mar. 24, 2005 (JP) .................. 2005-085245

(51) Int. Cl.
  *G06F 13/28* (2006.01)
  *G06F 15/167* (2006.01)
  *G06F 12/00* (2006.01)
  *G06F 13/00* (2006.01)
(52) U.S. Cl. ............... 710/22; 709/212; 711/154
(58) Field of Classification Search .......... 710/22, 710/32; 709/212; 711/154
  See application file for complete search history.

(56) References Cited

U.S. PATENT DOCUMENTS

| | | | | |
|---|---|---|---|---|
| 5,016,221 A | * | 5/1991 | Hamstra | 365/221 |
| 5,365,485 A | * | 11/1994 | Ward et al. | 365/189.15 |
| 6,069,874 A | * | 5/2000 | Morishima | 370/242 |
| 6,185,633 B1 | * | 2/2001 | Johnson | 710/22 |
| 6,266,789 B1 | * | 7/2001 | Bucher et al. | 714/39 |
| 6,651,103 B1 | * | 11/2003 | Markowitz et al. | 709/231 |
| 6,829,660 B2 | * | 12/2004 | Liu et al. | 710/22 |
| 6,870,854 B1 | * | 3/2005 | Aimoto et al. | 370/412 |
| 2003/0206475 A1 | * | 11/2003 | Duh et al. | 365/221 |
| 2006/0126665 A1 | * | 6/2006 | Ward et al. | 370/474 |

FOREIGN PATENT DOCUMENTS

| | | |
|---|---|---|
| JP | 05-257847 | 10/1993 |
| JP | 2000-010758 | 1/2000 |

* cited by examiner

*Primary Examiner* — Alford Kindred  
*Assistant Examiner* — Farley Abad  
(74) *Attorney, Agent, or Firm* — Fujitsu Patent Center (57) ABSTRACT

A communication data controller is provided which is capable of correctly retransmitting transmission data even if a block of the transmission data exceeding a FIFO (First-In First-Out) memory is written in an overwriting manner to the FIFO memory. The memory stores transmission data to be transmitted to a communication device. Transmission data stored in the memory is written and read to and from the FIFO memory by a CPU (Central Processing Unit). A DMAC (Direct Memory Access Controller) driver, when a request for retransmission of a block is made in the case where the block of transmission data exceeding a capacity of the FIFO memory is written to the FIFO memory, drives the DMAC and transfers the block being stored in the memory to the communication data controller.

5 Claims, 8 Drawing Sheets

COMMUNICATION DATA CONTROLLER

CROSS-REFERENCE TO RELATED APPLICATIONS

This application is based on, and claims priority to, Japanese Application No. 2005-085245, filed on Mar. 24, 2005, the entire contents of which are incorporated herein by reference.

BACKGROUND OF THE INVENTION

1. Field of the Invention

The present invention relates to a communication data controller, and particularly to a communication data controller to carry out communication by writing transmission data on a FIFO (First-In First-Out) memory.

2. Description of the Related Art

Communication devices or the like have a communication data controller being equipped with a FIFO memory to control receiving and transmitting of data. The communication data controller, when receiving transmission data from a controlling device such as a CPU (Central Processing Unit) or the like, transmits the transmission data independently from the controlling device to a party with which communication is carried out. This enables decrease in a processing load on the controlling device.

Moreover, in the communication data controller, since transmission data is written on the FIFO memory, when an error or the like occurs during data transmission, by controlling an address of the transmission data stored in the FIFO memory, the transmission data can be retransmitted without rewriting of the transmission data (see, for example, Japanese Unexamined Patent Publication Nos. 2000-10758 and Hei 5-257847).

Figure 6:
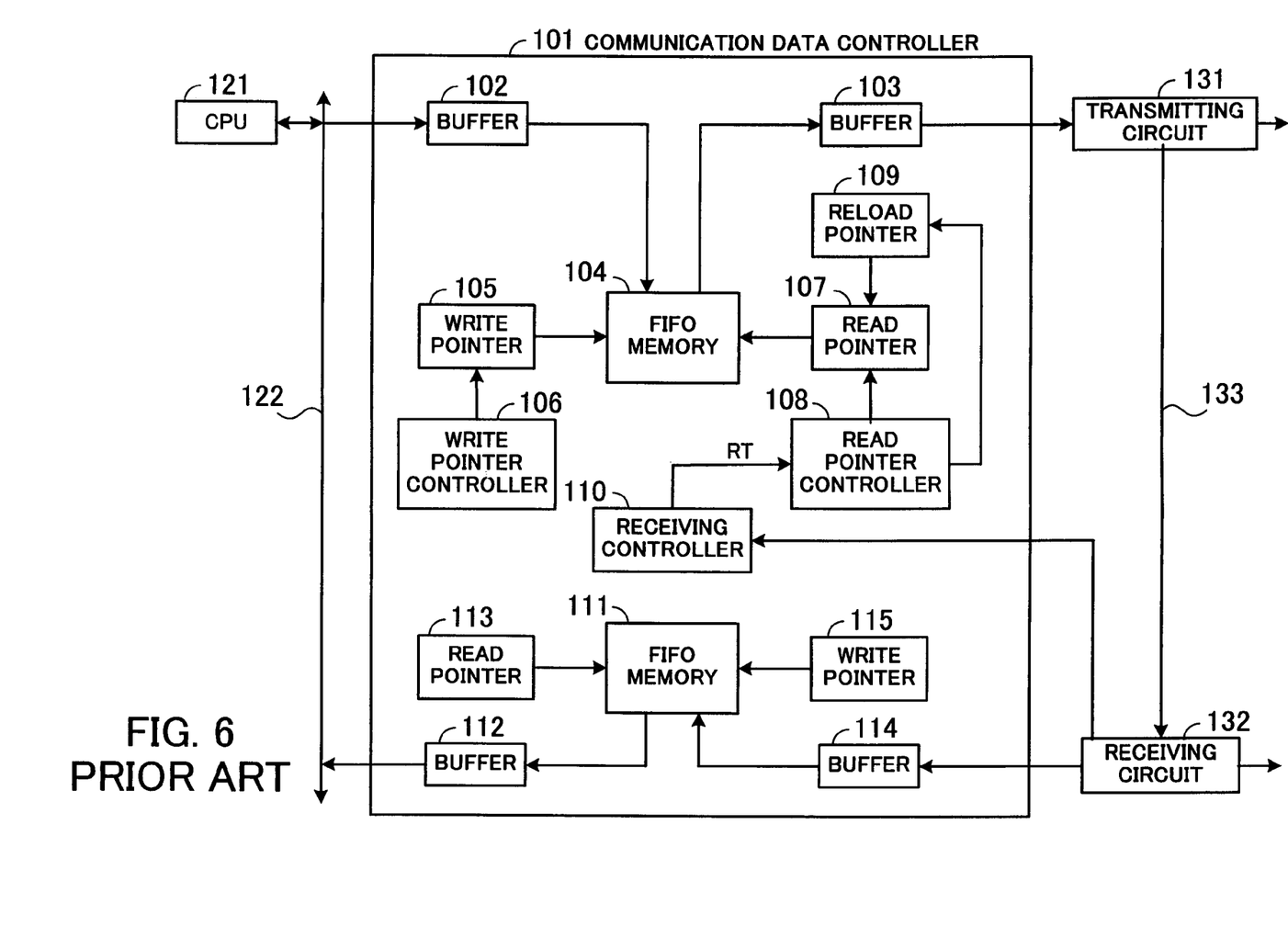
FIG. 6 shows an example of a circuit of a conventional communication data controller.

FIG. 6 shows an example of a circuit of a conventional communication data controller. As shown in FIG. 6, the communication data controller 101 is connected to a CPU 121 via a bus 122. Also, the communication data controller 101 is connected to a transmitting circuit 131 to transmit data and to a receiving circuit 132 used to receive data. A foldover wiring 133 is connected between the transmitting circuit 131 and the receiving circuit 132 so that transmission data output from the communication data controller 101 to the transmitting circuit 131 can be monitored. The transmitting circuit 131 and receiving circuit 132 are further connected to other communication device being a party with which communication is carried out.

The CPU 121, when transmitting transmission data to the communication device being the party with which communication is carried out, writes the transmission data on a buffer 102 in the communication data controller 101. The buffer 102 writes the written data on the FIFO memory 104. The write pointer 105 generates an address of the FIFO memory 104. The write pointer controller 106 controls the address generation to be performed by the write pointer 105. For example, the write pointer controller 106, when the transmission data stored in the buffer 102, exercises control so as to increment the address generated by the write pointer 105. Also, the write pointer controller 106, when the address generated by the write pointer 105 becomes a last one, exercises control so as to make the last address become a head address. The read pointer 107 generates an address used to read out transmission data from the FIFO memory 104. The read pointer controller 108 controls the address generation to be performed by the read pointer 107. For example, the read pointer controller 108, when transmission data is read out from the FIFO memory 104, controls so as to increment the address generated by the read pointer 107. Also, the read pointer controller 106, when the address generated by the read pointer 107 becomes a last one, exercises control so as to make the last address become a head address. Moreover, the write pointer controller 106 and the read pointer controller 108 control the address of the FIFO memory 104 so that the transmission data is written or read according to the FIFO method. The transmission data read from the FIFO memory 104 is transmitted to a communication device through the buffer 103 and the transmitting circuit 131. The reload pointer 109 stores an address of the transmission data to be retransmitted when transmission of data fails. The address of the reload pointer 109 is controlled by the CPU 121 (In FIG. 6, a line between the CPU 121 and the reload pointer 109 is omitted).

The CPU 121, when writing a block of transmission data on the FIFO memory 104, controls so as to store an address of the FIFO memory 104 on which a head of the block has been written in the reload pointer 109. Therefore, when a request for retransmission of transmission data is made, by setting an address of the reload pointer 109 to the read pointer 107, a block containing transmission data which has been requested to be retransmitted is retransmitted from the FIFO memory 104. Moreover, transmission data has a certain size and is, for example, one byte of data. The block is a collection of data and, for example, the block is delimited appropriately so that one block makes up one piece of data. How the block is delimited is judged by the CPU 121.

The receiving controller 110 judges whether or not retransmission of data is necessary. For example, the receiving controller 110 judges that the transmission of data is necessary when an error occurs in communications from a communication device being a party with which communication is carried out or when transmission data being monitored by the foldover wiring 133 is different from the transmission data or the like. The receiving controller 110, when judging that the retransmission of data is required, transmits a retransmission trigger signal RT to the read pointer controller 108.

The read pointer controller 108, when receiving the retransmission trigger signal RT from the receiving controller 110, controls the reload pointer 109 so as to set an address of the reload pointer 109 to the read pointer 107. As a result, a block of transmission data being stored in the FIFO memory 104 is read out, beginning with its head of the block, and is retransmitted to a communication device.

The receiving circuit 132 receives receiving data from the communication device being a party with which communication is carried out. The receiving circuit 132 writes received data on the buffer 114. The buffer 114 writes the written data on the FIFO memory 111.

The write pointer 115 generates an address used to write the received data on the FIFO memory 111. The read pointer 113 generates an address used to read out the received data written on the FIFO memory 111. The received data read out from the FIFO memory 111 is output to the CPU 121 through the buffer 112 and the bus 122. Moreover, in FIG. 6, a pointer controller to control address generation to be performed by the read pointer 113 and write pointer 115 is omitted. The pointer controller controls the address of the FIFO memory 111 so that the transmission data is written or read according to the FIFO method.

However, when a block of transmission data to be transmitted to a party with which communication is carried out exceeds a capacity of the FIFO memory, transmission data exceeding the capacity of the FIFO memory must be overwritten on an area in which transmission of data has already been completed. Therefore, there is a problem that, if necessity of the retransmission of a block arises, the transmission data has been partially lost in the FIFO memory, thus making it impossible to correctly retransmit the data stored in the FIFO memory.

Figure 7:
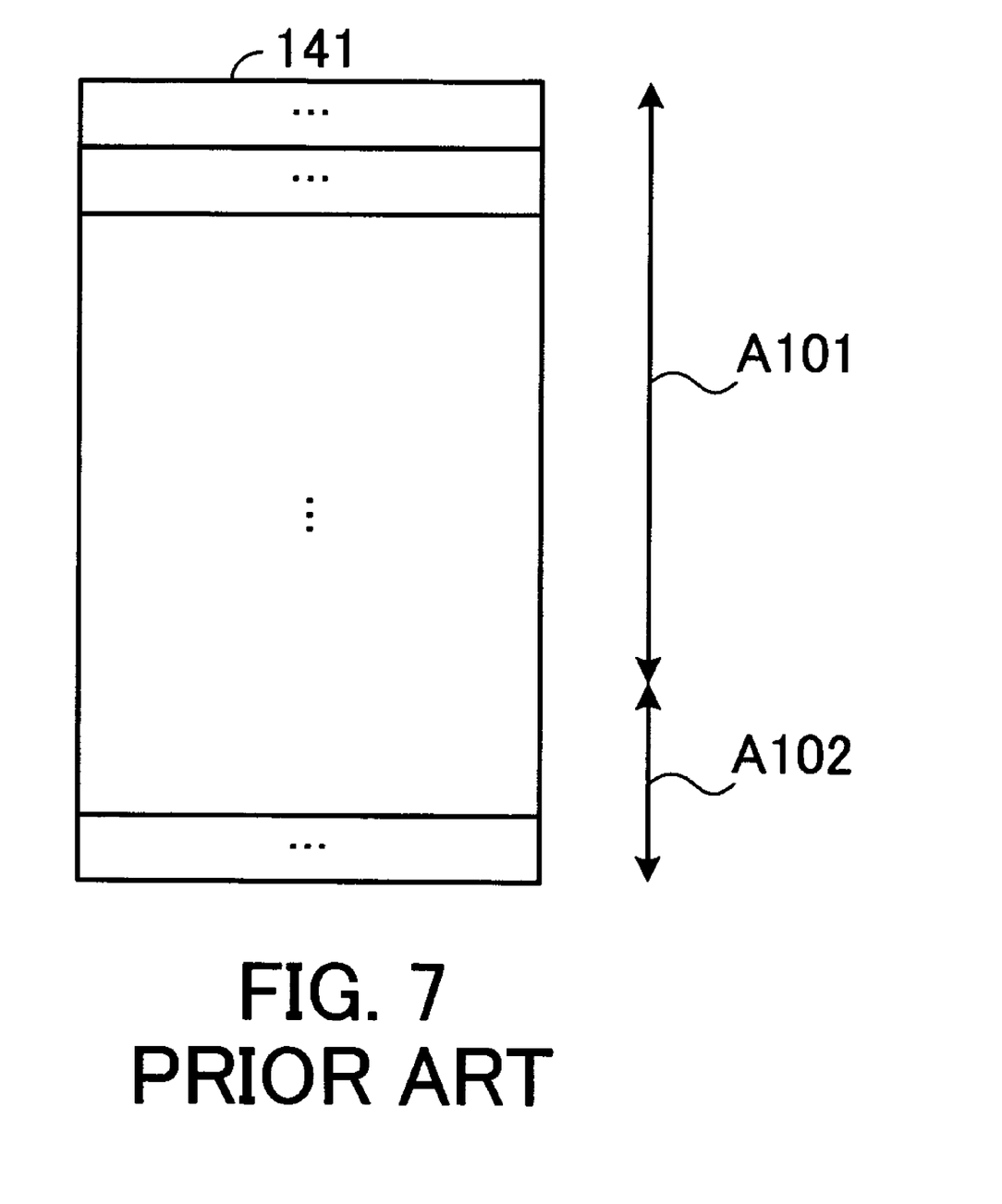
FIG. 7 shows a diagram explaining a state of a FIFO memory occurring when a block of transmission data exceeds a capacity of the FIFO memory.

FIG. 7 shows a diagram explaining a state of a FIFO memory occurring when a block of transmission data exceeds a capacity of the FIFO memory. In FIG. 7, a block 141 of transmission data to be transmitted to a communication device of a party with which communication is carried out is shown. The double-headed arrow A101 shows a capacity of the FIFO memory of the transmission data controller 101. As shown in FIG. 7, since the capacity of the block 141 exceeds the capacity of the FIFO memory, a portion of the block 141 that exceeds the capacity of the FIFO memory, that is, a portion shown by the double-headed arrow is overwritten on a FIFO memory area in which transmission of data has been already completed. Therefore, if necessity of retransmission of the block 141 arises, the transmission data has been partially lost and, as a result, it is impossible to retransmit correct transmission data from the FIFO memory.

Moreover, when the transmission of a block of transmission block has not yet been completed, if a subsequent block is written on the FIFO memory, an address of the subsequent block is stored in the reload pointer. Therefore, a problem arises that, if necessity of retransmission of a block existing before a newest block arises, an address of the block to be retransmitted has been lost and the retransmission is made impossible.

Figure 8:
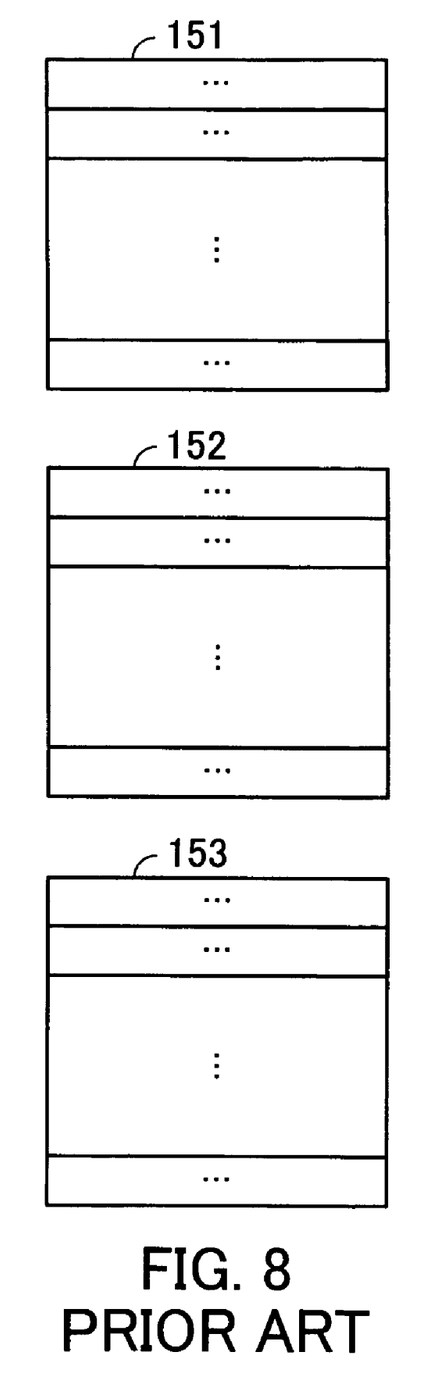
FIG. 8 shows a diagram explaining a state of a reload pointer occurring when a block of transmission data is written to a plurality of FIFO memories.

FIG. 8 shows a diagram explaining a state of a read pointer occurring when a block of transmission data is written on a plurality of FIFO memories. In FIG. 8, a plurality of blocks 151 to 153 written on the FIFO memory is shown. Now let it be assumed that, during transmission of the block 151, the blocks 152 and 153 are written, without being overwritten, on the FIFO memory. In this case, an address of the FIFO memory in which a head of the block 153 has been stored is stored in the reload pointer 109. Therefore, during the transmission of the block 151 or the block 152, if a request for the retransmission of transmission data is made, since the address of the reload pointer 109 has been changed, which makes it impossible to retransmit the data.

SUMMARY OF THE INVENTION

In view of the foregoing, it is an object of the present invention to provide a communication data controller which is capable of retransmitting data correctly even when a block of transmission data exceeds a capacity of a FIFO memory. It is another object of the present invention to provide a communication data controller which is capable of retransmitting data correctly even when a plurality of blocks of transmission data is stored in the FIFO memory.

To accomplish the above object, according to the present invention, there is provided a communication data controller for controlling communication of transmission data being stored in a memory connected through a bus, including a FIFO memory to which the transmission data is written and from which the transmission data is read out and a DMAC (Direct Memory Access Controller) driver which, when a block of the transmission data exceeding a capacity of the FIFO memory is written to the FIFO memory, if a request for retransmission of the transmission data is made, drives the DMAC being connected to the bus and transfers the block of the transmission data stored in the memory to the FIFO memory.

To accomplish the above another object, according to the present invention, there is provided a communication data controller for controlling communication of communication data including a FIFO memory to which transmission data to which retransmission starting point information informing that the point is a starting point for retransmission has been attached is written and from which the transmission data is read out, a read pointer to generate a reading address used to read the transmission data from the FIFO memory, a reload pointer to output the reading address being stored therein to the read pointer when a request for retransmission of the transmission data is made and a pointer controller to store the reading address generated by the read pointer in the reload pointer according to the retransmission starting point information for the transmission data read out from the FIFO memory.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, operational principles of the communication data controller of the present invention are described by referring to drawings.

Figure 1:
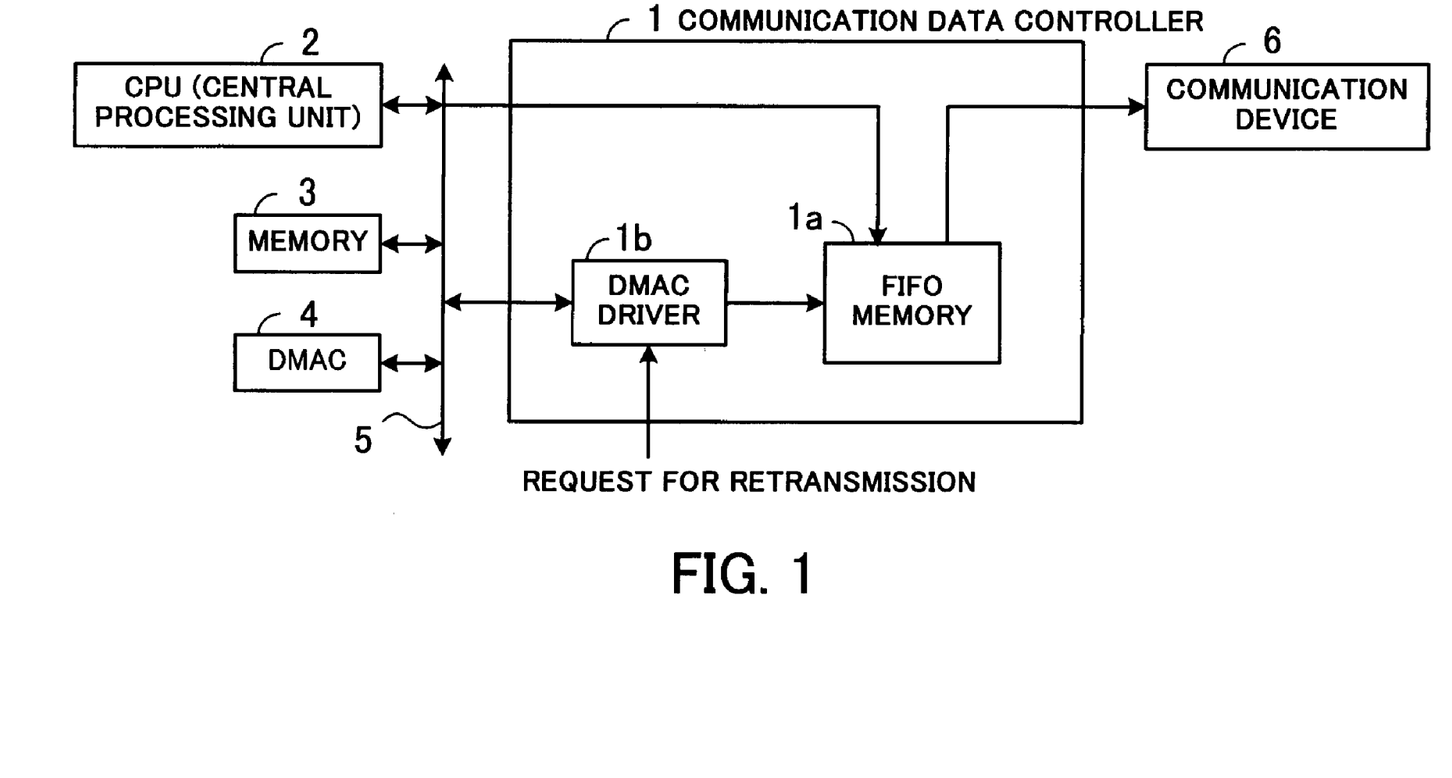
FIG. 1 shows schematically a communication data controller of the present invention.

FIG. 1 schematically shows a communication data controller of the present invention. As shown in FIG. 1, the communication data controller 1 has a FIFO memory 1a which writes and reads data according to a FIFO method and a DMAC driver 1b. The communication data controller 1 is connected to a CPU 2, a memory 3, a DMAC 4 via a bus 5. The communication data controller 1 is connected to a communication device 6 being a party with which communication is carried out. The memory 3 stores transmission data to be transmitted to the communication device 6. Transmission data being stored in the memory 3 is written on the FIFO memory 1a by the CPU 2. The read transmission data is transmitted to the communication device 6. The DMAC 1b drives the DMAC 4 when a request for retransmission is made in a state in which a block of transmission data exceeding a capacity of the FIFO memory 1a is written on the FIFO memory 1. The DMAC driver 1b transfers the block of transmission data that has been stored by the memory 3 and has been requested to be retransmitted to the communication data controller 1. Moreover, transmission data has a certain size and is, for example, one byte of data. The block is a collection of data and, for example, the block is delimited appropriately so that one block makes up one piece of data. How the block is delimited is judged by the CPU 2. The CPU 2, when the transmission data read from the memory 3 is a head of the block, sets the head address and size of the block to the DMAC 4. Therefore, the DMAC 4, when receiving a request for retransmission of the block, can transfer the block containing the transmission data according to the head address and size of the block that have been already set.

Thus, the communication data controller 1, when receiving a request for retransmission of a block in a state in which the block of transmission data exceeding a capacity of the FIFO memory 1a is written on the FIFO memory 1a, drives the DMAC 4 and transfers the block of transmission data to be retransmitted from the memory 3 to the FIFO memory 1a. By configuring as above, since the block of transmission data exceeds a capacity of the FIFO memory 1a, even if the block has been overwritten on the FIFO memory 1a, the block being stored in the memory 3 is correctly transferred by the DMAC 4, thus enabling the transmission data to be correctly retransmitted.

Figure 2:
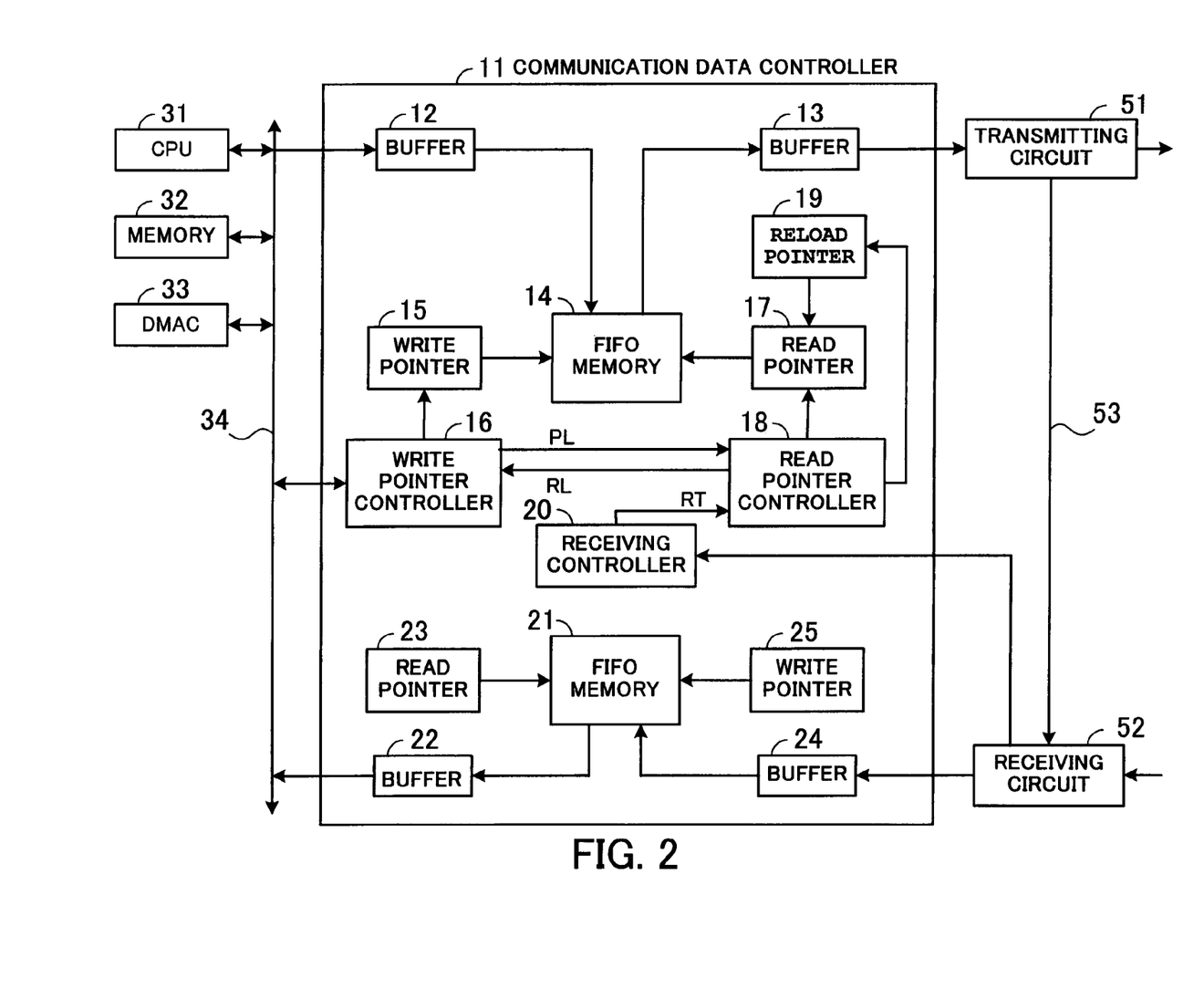
FIG. 2 shows a circuit diagram of a communication data controller of a first embodiment of the present invention.

Next, a first embodiment of the present invention is described in detail by referring to FIG. 2. FIG. 2 shows a circuit diagram of the communication data controller of the first embodiment of the present invention. As shown in FIG. 2, the communication data controller 11 includes buffers 12, 13, 22, and 24, FIFO memories 14 and 21, write pointers 15 and 25, a write pointer controller 16, read pointers 17 and 23, a read pointer controller 18, a reload pointer 19, and a receiving controller 20. Also, as shown in FIG. 2, the communication data controller 11 is connected to a CPU 31, a memory 32, and a DMAC 33 via a bus 34. The communication data controller 1 is connected to a transmitting circuit 51 to transmit data and a receiving circuit 52 to receive data. Between the transmitting circuit 51 and the receiving circuit 52 is connected a foldover wiring 53 so that the communication data controller 11 can monitor transmission data output from the transmitting circuit 51. The transmitting circuit 51 and receiving circuit 52 are further connected to a communication device being a party with which communication is carried out. The memory 32 stores transmission data to be transmitted to a communication device being the party with which communication is carried out. The CPU 31, when transmitting data being stored in the memory 32 to a communication device being a party with which communication is carried out, writes the transmission data on the buffer 12 in the communication data controller 11.

The buffer 12 writes the written transmission data on the FIFO memory 14. The buffer 12 makes the transmission data to be transmitted from the CPU 31 match, for example, an electrical characteristic of the FIFO memory 14. The write pointer 15 generates an address used to write transmission data on the FIFO memory 14. The write pointer controller 16 controls the address generation to be performed by the write pointer 15. For example, the write pointer controller 16, after the transmission data of the buffer 12 has been written on the FIFO memory 14, controls so as to increment an address of the write pointer 15. Also, the write pointer controller 16, when an address of the write pointer 15 becomes a last one, controls so as to make the last address become a head address. The read pointer 17 generates an address used to read out the transmission data from the FIFO memory 14. The read pointer controller 18 controls the address generation to be performed by the read pointer 17. For example, the read pointer controller 18, after the transmission data has been read from the FIFO memory 14, controls so as to increment an address of the read pointer 17. Also, the read pointer controller 18, when an address of the read pointer 17 becomes a last one, controls so as to make the last address become a head address. Moreover, the write pointer controller 16 and the read pointer controller 18 control an address of the FIFO memory 14 so that the transmission data is written or read according to the FIFO method. The transmission data read from the FIFO memory 14 is transmitted via the buffer 13 and the transmitting circuit 51 to a communication device.

The reload pointer 19 stores an address of transmission data required when a request for retransmission of the transmission data is made. An address of the reload pointer 19 is controlled by the CPU 31 (In FIG. 2, a line between the CPU 31 and reload pointer 19 is omitted).

The CPU 31, when writing a block of transmission data on the FIFO memory 14, controls so as to store an address of the FIFO memory 14 in which a head of the block is written in the reload pointer 19. Therefore, when a request for retransmission of the transmission data is made, by setting an address of the reload pointer 19 to the read pointer 17, the block containing transmission data having been requested to be retransmitted is retransmitted from the FIFO memory 14. Moreover, transmission data has a certain size and is, for example, one byte of data. The block is a collection of data and, for example, the block is delimited appropriately so that one block makes up one piece of data. How the block is delimited is judged by the CPU 31.

The receiving controller 20 judges whether or not the retransmission of transmission data is necessary. For example, the receiving controller 20 judges the retransmission as necessary when receiving a request for the retransmission from a communication device being a party with which communication is carried out, if the transmission data being monitored by the foldover wiring 53 is different from the transmission data to be transmitted or if the number of bytes of the response receiving data fed from the communication device is less than a specified number of bytes and, after the last response receiving data has been received, a baud rate clock is counted and the counted clock becomes a specified value or more, or the like. The receiving controller 20, when judging the retransmission of the transmission data as necessary, transmits a retransmission trigger signal RT to the read pointer controller 18.

The read pointer controller 18, when receiving the retransmission trigger signal RT from the receiving controller 20, controls the reload pointer 19 so that an address of the reload pointer 19 is set to the read pointer 17. As a result, the block of the transmission data being stored in the FIFO memory 14 is read out, beginning with its head, and is retransmitted to the communication device. When a size of the block of the transmission data exceeds a capacity of the FIFO memory 14, the transmission data corresponding to a portion exceeding the capacity is overwritten on an area of the FIFO memory 14 in which transmission has been already completed. In this case, if a request for the retransmission of a block is made, since the block of the transmission data has been partially lost, it is impossible to correctly retransmit the transmission data. Then, the write pointer controller 16 counts an address of the write pointer 15 and judges whether the transmission data to be written on the FIFO memory 14 exceeds a capacity of the FIFO memory 14. The write pointer controller 16, when judging that the transmission data has been overwritten, outputs a pointer lost signal PL to the read pointer controller 18.

The read pointer controller 18, when receiving the retransmission trigger signal RT from the receiving controller 20 in a state where the pointer lost signal PL has been received, initializes the read pointer 17 without setting the address of the reload pointer 19 to the read pointer 17 and outputs a reload signal RL to the write pointer controller 16. The write pointer controller 16, when receiving the reload signal RL from the read pointer controller 18, initializes the write pointer 15 and drives the DMAC 33 via the bus 34. There is a limit on the number of times of transfer caused by a failure in the transfer. If the number of times of the above transfer exceeds the limited number of times, the write pointer controller 16 outputs an abort signal to the DMAC 33. In the DMAC 33 are stored a head address of the block of transmission data and the number of times of the transfer. The head address and number of times of the transfer are written by the CPU 31 when the CPU 31 writes the block of transfer data on the FIFO memory 14. The DMAC 33, when being driven by receipt of a request for retransmission of data, transmits a block of transmission data to the communication data controller 11, according an address and size of the block that have been already set, so as to make the transmission data be retransmitted. Moreover, the CPU 31 may set a head address and size of the block to the DMAC 33 only when judging that the block of transmission data to be output to the communication data controller 11 is larger than a capacity of the FIFO memory 14. Also, the DMAC 33, when receiving the abort signal from the write pointer controller 16, discontinues transferring the transmission data.

The receiving circuit 52 receives receiving data from a communication device being a party with which communication is carried out. The receiving circuit 52 writes receiving data on the buffer 24. The buffer 24 writes the written receiving data on the FIFO memory 21. The write pointer 25 generates an address used to write the receiving data on the FIFO memory 21. The read pointer 23 generates an address used to read the receiving data written on the FIFO memory 21. The receiving data read from the FIFO memory 21 is output to the CPU 31 via the buffer 22 and the bus 34. In FIG. 2, a pointer controller to control address generation by the write pointer 25 and read pointer 23. The pointer controller controls an address so that transmission data is written or read on the FIFO memory 21 according to the FIFO method.

Hereinafter, operations of the communication data controller 11 shown in FIG. 2 are described. The CPU 31 outputs transmission data being stored in the memory 32 to the communication data controller 11. At this time point, if transmission data is a head of the block, the CPU 31 writes a head address and size (number of times of transfer) of the block stored in the memory 32 to the DMAC 33. The transmission data read by the CPU 31 from the memory 32 is written on the FIFO memory 14 in the communication data controller 11. When the transmission data to be written on the FIFO memory 14 is a head data of the block, an address of the transmission data written on the FIFO memory 14 is written by the CPU 31 on the reload pointer 19. In the case where a size of transmission data stored in the FIFO memory 14 is a capacity of the FIFO memory 14 or less, if a retransmission trigger signal RT is output from the receiving controller 20 (when a request for retransmission of transmission data is made), the read pointer controller 18 controls the reload pointer 19 so that an address of the reload pointer 19 is set to the read pointer 17. As a result, the transmission data being store in the FIFO memory 14 is again transmitted to the communication device being a party with which communication is carried out.

On the other hand, when the transmission data exceeding the capacity of the FIFO memory 14 is written on the FIFO memory 14, a pointer lost signal PL fed from the write pointer controller 16 is output to the read pointer controller 18. In the case where the pointer lost signal PL is output, when the retransmission signal RT is output from the receiving controller 20 (when a request for retransmission of transmission data is made), the read pointer controller 18 outputs a reload signal RL to the write pointer controller 16. The write pointer controller 16, when receiving the reload signal RL from the read pointer controller 18, drives the DMAC 33 via the bus 34. The DMAC 33 transfers the transmission data being stored in the memory 32 to the communication data controller 11 according to the head address and number of times of transfer of the block being written by the CPU 31. As a result, even if the transmission data exceeds a capacity of the FIFO memory 14, correct retransmission is made possible.

Thus, the communication data controller 11 of the first embodiment is so configured that, in the case where the block of the transmission data exceeding the capacity of the FIFO memory 14 is written on the FIFO memory, if a retransmission signal RT exists, the DMAC 33 is driven and the transmission data to be retransmitted is transferred from the memory 32 to the FIFO memory 14. Thus, since the block of the transmission data is larger than a capacity of the FIFO memory 14, even if the transmission data has been partially overwritten on the FIFO memory, the block being stored in the memory 32 is retransmitted by the DMAC 33 and, therefore, it is made possible to correctly retransmit the transmission data.

Moreover, the block of transmission data stored in the memory 32 can be transferred to the communication data controller 11 without passing through the CPU 31, which enables a load on the CPU 31 to be reduced.

Figure 3:
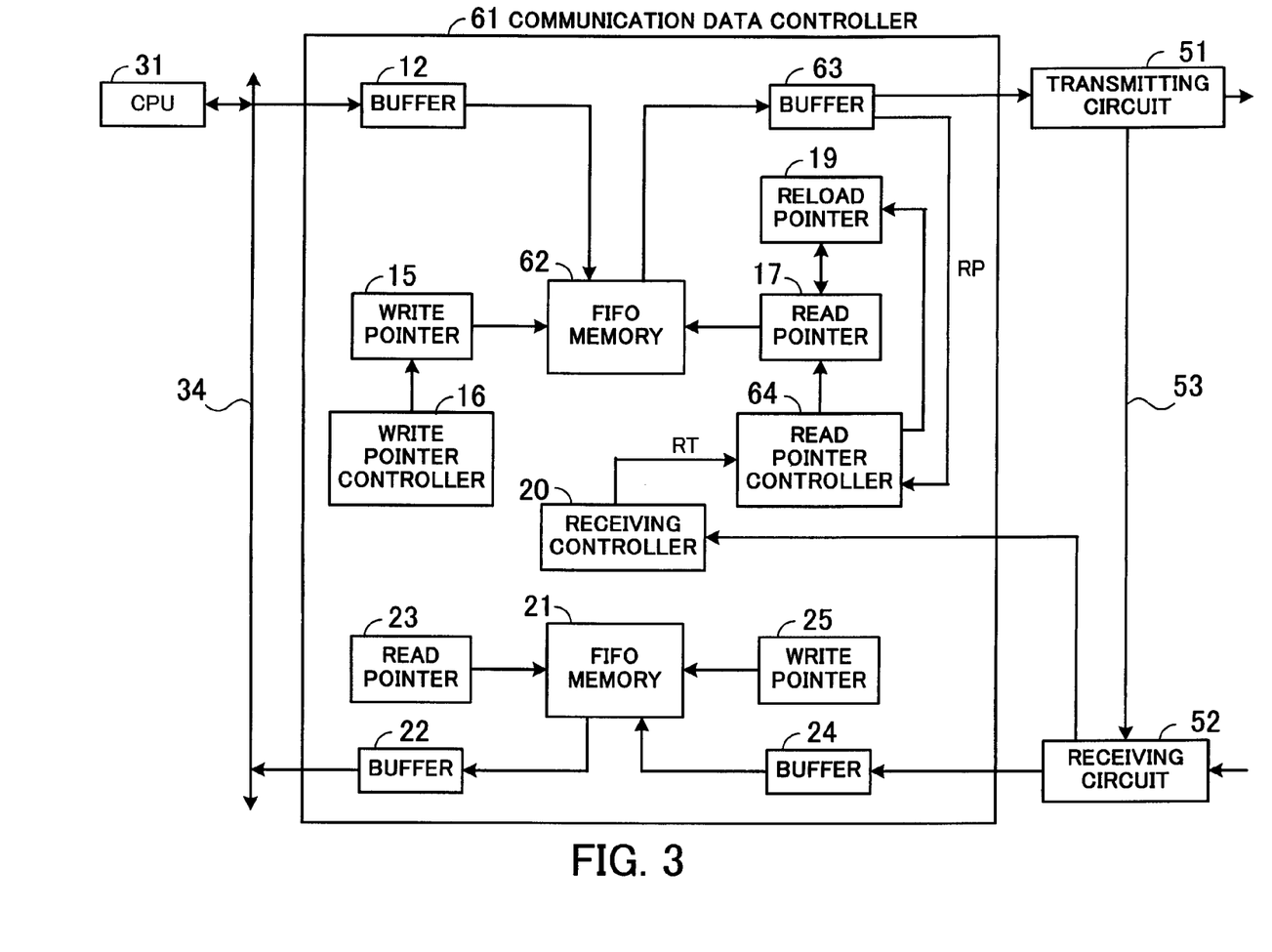
FIG. 3 shows a circuit diagram of a communication data controller of a second embodiment of the present invention.

Next, a communication data controller of a second embodiment of the present invention is described by referring to FIG. 3.

FIG. 3 shows a circuit diagram of the communication data controller 61 of the second embodiment of the present invention. In FIG. 3, same reference numbers are assigned to components having the same functions as those shown in FIG. 2 and their descriptions are omitted accordingly.

In the FIFO memory 62 is stored transmission data to be transmitted by the CPU 31. To the transmission data is attached reload information showing whether or not the transmission data is a head of a block. The reload information is attached by the CPU 31 when the CPU 31 transmits transmission data to the communication data controller 61. Moreover, the CPU 31 reads transmission data from a memory (not shown) being connected to a bus 34 and outputs the read transmission data to the communication data controller 61.

Figure 4:
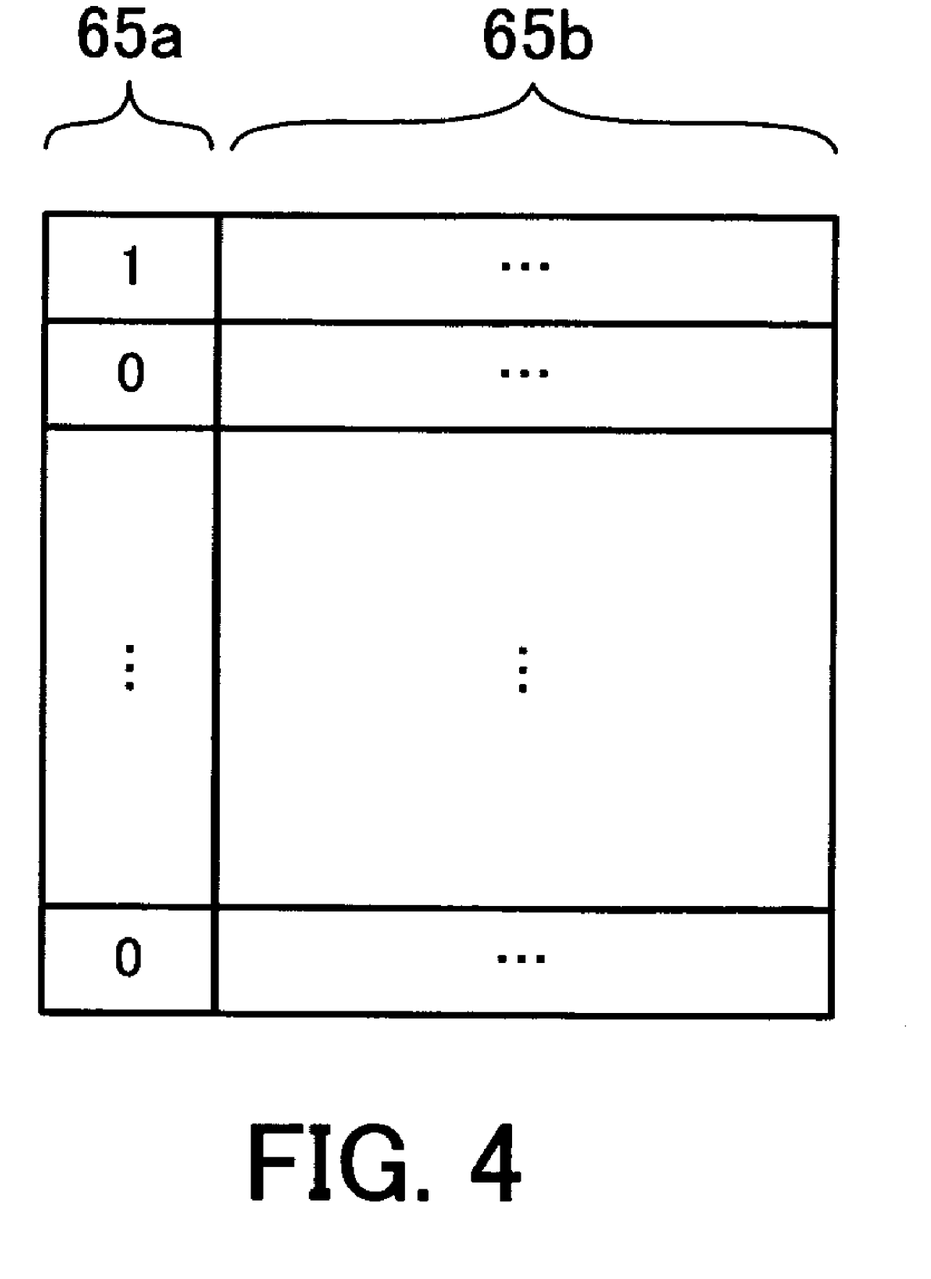
FIG. 4 shows an example of a data format of transmission data to be stored in a FIFO memory.

FIG. 4 shows an example of a data format of transmission data to be stored in a FIFO memory. As shown in FIG. 4, the transmission data is made up of an area 65a to store reload information and an area 65b being a main body of the transmission data. When the reload information in the area 65a is, for example, 1, the transmission data in the area 65b is a head of the block, while, when the reload information in the area 65a is, for example, 0, the transmission data in the area 65b is not the head of the block.

In FIG. 3, the transmission data to which the reload information stored in the FIFO memory 62 is attached is read out according to an address shown by the read pointer 17 and is output to the buffer 63. The buffer 63 separates the reload information being attached to the transmission data from the main body of the transmission data. The separated transmission data is output to the transmitting circuit 51 and the reload information is output to the read pointer controller 64 as a reload point signal RP.

The read pointer controller 64, according to a reload point signal RP fed from the buffer 63, controls so that the reload pointer 19 stores an address shown by the read pointer 17. For example, in the case where the reload point signal RP is "1", that is, in the case where the transmission data read from the FIFO memory 62 is a head of a block, the read pointer controller 64 controls the reload pointer 19 so that an address shown by the read pointer 17 is stored. Thus, whether or not the transmission data is a head of the retransmission data read from the FIFO memory 62 is judged and if the transmission data is the head of the retransmission data, the address shown by the read pointer 17 is stored in the reload pointer 19. Then, the read pointer controller 64, when receiving a retransmission trigger signal RT from the receiving controller 20, controls the reload pointer 19 so that the address stored in the reload pointer 19 is set to the read pointer 17. As a result, even when a plurality of blocks is stored in the FIFO memory 62, no overwriting occurs in the reload pointer 19, which enables correct transmission of a block to be retransmitted. Moreover, the control of the read pointer 17 in the read pointer controller 64 is performed in the same way as in the case of the read pointer controller 18 shown in FIG. 2.

Next, operations of the communication data controller 61 shown in FIGS. 3 and 4 are described. Reload information is attached by the CPU 31 to the transmission data and the transmission data with the reload information being attached is written on the FIFO memory 62. The transmission data written on the FIFO memory 62 is read out according to the address shown by the read pointer 17 and is then output to the buffer 63. The buffer 63 outputs the reload information contained in the transmission data output from the FIFO memory 62 to the read pointer controller 64 as a reload point signal RP. The read pointer controller 64, when the reload point signal RP is a head transmission data of a block, controls the reload pointer 19 so that the address shown by the read pointer 17 is stored. As a result, a head address of a block to be retransmitted is set to the reload pointer 19. The read pointer controller 64, when receiving a retransmission trigger signal RT from the receiving controller 20, controls the reload pointer 19 so that the address stored in the reload pointer 19 is set to the read pointer 17.

Thus, the communication data controller 61 of the second embodiment is so configured that a reading address of transmission data output from the FIFO memory 62 is set to the reload pointer 19 according to reload information being attached to the transmission data read from the FIFO memory 62. As a result, even if a block of the subsequent transmission data is written to the FIFO memory 62 when transmission of a block of the transmission data is not yet completed, no overwriting occurs in the reload pointer 19 and the transmission data can be correctly retransmitted. Moreover, an address of the reload pointer 19 is set without using the CPU 31, a load on the CPU 31 can be reduced.

Figure 5:
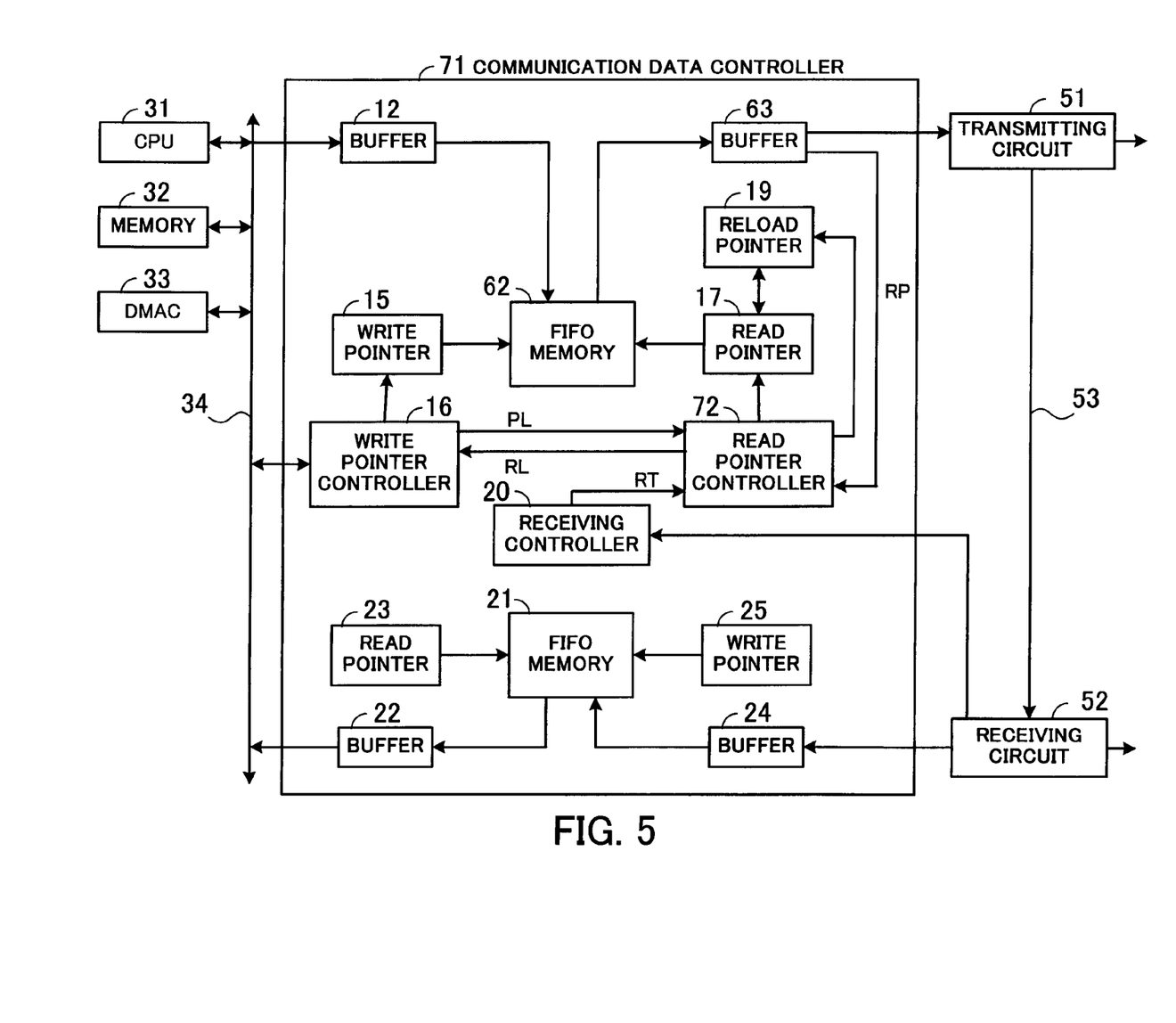
FIG. 5 shows a circuit diagram of a communication data controller of a third embodiment of the present invention.

Next, configurations of a communication data controller of a third embodiment of the present invention are described by referring to FIG. 5. FIG. 5 shows a circuit diagram of the communication data controller 71 of the third embodiment of the present invention. In FIG. 5, same reference numbers are assigned to components having the same functions as those shown in FIGS. 2 and 3 and their descriptions are omitted accordingly. The communication data controller 71 shown in FIG. 5 provides both the functions shown in FIG. 2 and in FIG. 3.

The read pointer controller 72, in a state where the read pointer controller 72 is receiving a point lost signal PL from the write pointer controller 16, if receiving a retransmission trigger signal RT from the receiving controller 20, outputs a reload signal RL to the write pointer controller 16. Also, the read pointer controller 72, when a reload point signal RT is output from the buffer 63, controls so that the reload pointer 19 stores an address shown by the read pointer 17.

Operations of the communication data controller 71 shown in FIG. 5 are combinations of the operations of the communication data controller 11 shown in FIG. 2 and of the operations of the communication data controller 61 shown in FIG. 3. That is, reload information being attached to transmission data is separated by the buffer 63 and is output, as a reload point signal RP, to the read pointer controller 72. The read pointer controller 72, when the reload point signal RP is a head transmission data of a block, controls the reload pointer 19 so that the address shown by the read pointer 17 is stored. The read pointer controller 72, when a size of a block of transmission data is a capacity of the FIFO memory 62 or less, if receiving a retransmission trigger signal RT, sets an address of the reload pointer 19 to the read pointer 17.

On the other hand, if the size of the block of transmission data exceeds a capacity of the FIFO memory 62 and overwriting occurs, it is impossible to retransmit correct transmission data. In this case, the read pointer controller 72, when receiving a retransmission trigger signal RT, outputs a reload signal RL to the write pointer controller 16 and the write pointer controller 16 drives the DMAC 33. The DMAC 33 writes transmission data being stored in the memory 32 to the communication data controller 11 according to a head address of a block written by the CPU 31 and the number of times of transfer of the block. Reload information is not attached to the transmission data to be transferred by the DMAC 33.

Thus, the communication data controller 71 is so configured that a reading address of the transmission data output from the FIFO memory 62 is set to the reload pointer 19 according to reload information being attached to transmission data to be read out from the FIFO memory 62. As a result, when the transmission of a block of transmission data is not completed, even if the block of other transmission data is written to the FIFO memory 62, no overwriting occurs in the reload pointer 19 and the transmission data is correctly retransmitted.

Moreover, in the case where a block of transmission data exceeding a capacity of the FIFO memory 62 is written to the FIFO memory 62, if a retransmission trigger signal RT is received, the DMAC 33 is driven and a block to be retransmitted is transferred from the memory 32 to the FIFO memory 62. As a result, since the block of transmission data is larger than a capacity of the FIFO memory 62, even if the transmission data on the FIFO memory 62 is overwritten, the block being stored in the FIFO memory 62 is transferred by the DMAC 33 and, therefore, transmission data is correctly retransmitted. Also, an address of the reload pointer 19 is set and a block of transmission data stored in the memory 32 is transferred to the communication data controller 71 without using the CPU 31 and, therefore, it is possible to reduce a load on the CPU 31.

Thus, the communication data controller of the present invention is so configured that, when a request for retransmission of a block is made in the case where the block of transmission data exceeding a capacity of the FIFO memory is written, the DMAC is driven and the block to be retransmitted is transferred from the memory to the FIFO memory. As a result, since the block of transmission data is larger than the capacity of the FIFO memory, even if overwriting occurs, the block being stored in the memory is transferred by the DMAC and, therefore, it is possible to correctly retransmit transmission data.

Also, the communication data controller of the present invention is so configured that a reading address of transmission data read from the FIFO memory is stored in the reload pointer according to retransmission starting point information being attached to transmission data read out from the FIFO memory. As a result, when transmission of a block of transmission data is not completed, even if a block of subsequent transmission data is written to the FIFO memory, data on the reload pointer is not overwritten and transmission data can be correctly retransmitted.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication data controller for controlling communication of communication data comprising:
   a First-In First-Out (FIFO) memory to store transmission data, together with retransmission starting point information indicating a starting point at which retransmission of the transmission data is to start;
   a read pointer to generate a reading address used to read the transmission data from the FIFO memory;
   a reload pointer to output a reading address being stored therein to the read pointer once a request for retransmission of the transmission data is made; and
   a pointer controller to store the reading address generated by the read pointer in the reload pointer when the retransmission starting point information is attached to the transmission data read out from the FIFO memory.

2. The communication data controller according to claim 1, further comprising a separator to separate the retransmission starting point information read out from the FIFO memory.

3. The communication data controller according to claim 2, wherein the separator outputs the separated retransmission starting point information to the reload pointer and transmits the transmission data to a party with which communication is carried out.

4. A communication data controller for controlling communication of transmission data stored in a memory connected through a bus comprising:
   a First-In First-Out (FIFO) memory to store transmission data, together with retransmission starting point information indicating a starting point at which retransmission of the transmission data is to start;
   a read pointer to generate a reading address used to read the transmission data from the FIFO memory;
   a reload pointer to output the reading address being stored therein to the read pointer once a request for retransmission of the transmission data is made;
   a pointer controller to store the reading address generated by the read pointer in the reload pointer when the retransmission starting point information is attached to the transmission data read out from the FIFO memory; and
   a Direct Memory Access Controller (DMAC) driver which, once a block of the transmission data exceeding a capacity of the FIFO memory is written to the FIFO memory and once a request for retransmission of the transmission data is made, drives a DMAC being connected to the bus and transfers the block of the transmission data exceeding the capacity of the FIFO memory once written in the FIFO memory, from the memory to the FIFO memory.

5. The communication data controller according to claim 4, wherein a CPU being connected to the bus sets a head address and size of the block to the DMAC once a head of the block is read out.

* * * * *